United States Patent
Grabowski et al.

[19]

[11] Patent Number: 6,069,460
[45] Date of Patent: May 30, 2000

[54] METHOD FOR CONTROLLING AN ELECTRO-HYDRAULIC POWER ASSIST STEERING SYSTEM

[75] Inventors: John Robert Grabowski, Dearborn; Ross Maxwell Stuntz, Birmingham; Bernard Dale Baughn, Livonia; Theodore Joseph Filippi, Trenton, all of Mich.

[73] Assignee: Ford Global Technologies, Inc., Dearborn, Mich.

[21] Appl. No.: 09/088,339

[22] Filed: Jun. 1, 1998

[51] Int. Cl.[7] .................................................. H02K 17/32
[52] U.S. Cl. ......................... 318/434; 318/446; 318/465; 180/422; 180/417
[58] Field of Search ................................... 180/422, 415, 180/417, 419, 421; 318/434, 430, 432, 280–286, 446, 452–4, 461, 465

[56] References Cited

U.S. PATENT DOCUMENTS

| | | |
|---|---|---|
| 4,941,097 | 7/1990 | Karnopp et al. .................. 364/424.051 |
| 5,156,229 | 10/1992 | Yasui et al. ............................... 180/422 |
| 5,168,949 | 12/1992 | Emori et al. . |
| 5,267,627 | 12/1993 | Frank et al. . |
| 5,279,380 | 1/1994 | Frank et al. . |
| 5,289,894 | 3/1994 | Yoshiyuki Yasui . |
| 5,367,235 | 11/1994 | Fukudome . |
| 5,372,214 | 12/1994 | Haga et al. . |
| 5,508,919 | 4/1996 | Suzuki et al. . |
| 5,513,720 | 5/1996 | Yamamoto et al. ..................... 180/421 |
| 5,641,033 | 6/1997 | Langkamp . |
| 5,713,429 | 2/1998 | Doolittle . |
| 5,749,431 | 5/1998 | Peterson ................................. 180/421 |

FOREIGN PATENT DOCUMENTS 2249530A  5/1992  United Kingdom .

*Primary Examiner*—David Martin
*Attorney, Agent, or Firm*—Gregory P. Brown; Roger L. May

[57] ABSTRACT

A method is provided for controlling an electro-hydraulic power assist steering system including a variable-speed electric motor for pumping hydraulic fluid in the system. The method includes monitoring vehicle speed, vehicle steering wheel angle, and vehicle steering wheel turning rate. A parking mode or a driving mode is selected based upon the monitored vehicle speed. The speed of the variable speed electric motor is controlled based upon the monitored vehicle steering wheel turning rate if the parking mode is selected. If the driving mode is selected, the speed of the variable speed electric motor is controlled based upon the monitored vehicle speed, vehicle steering wheel angle and vehicle steering wheel angle turning rate. Accordingly, a wide range of vehicle driving conditions are accommodated and vehicle fuel efficiency is improved.

8 Claims, 1 Drawing Sheet

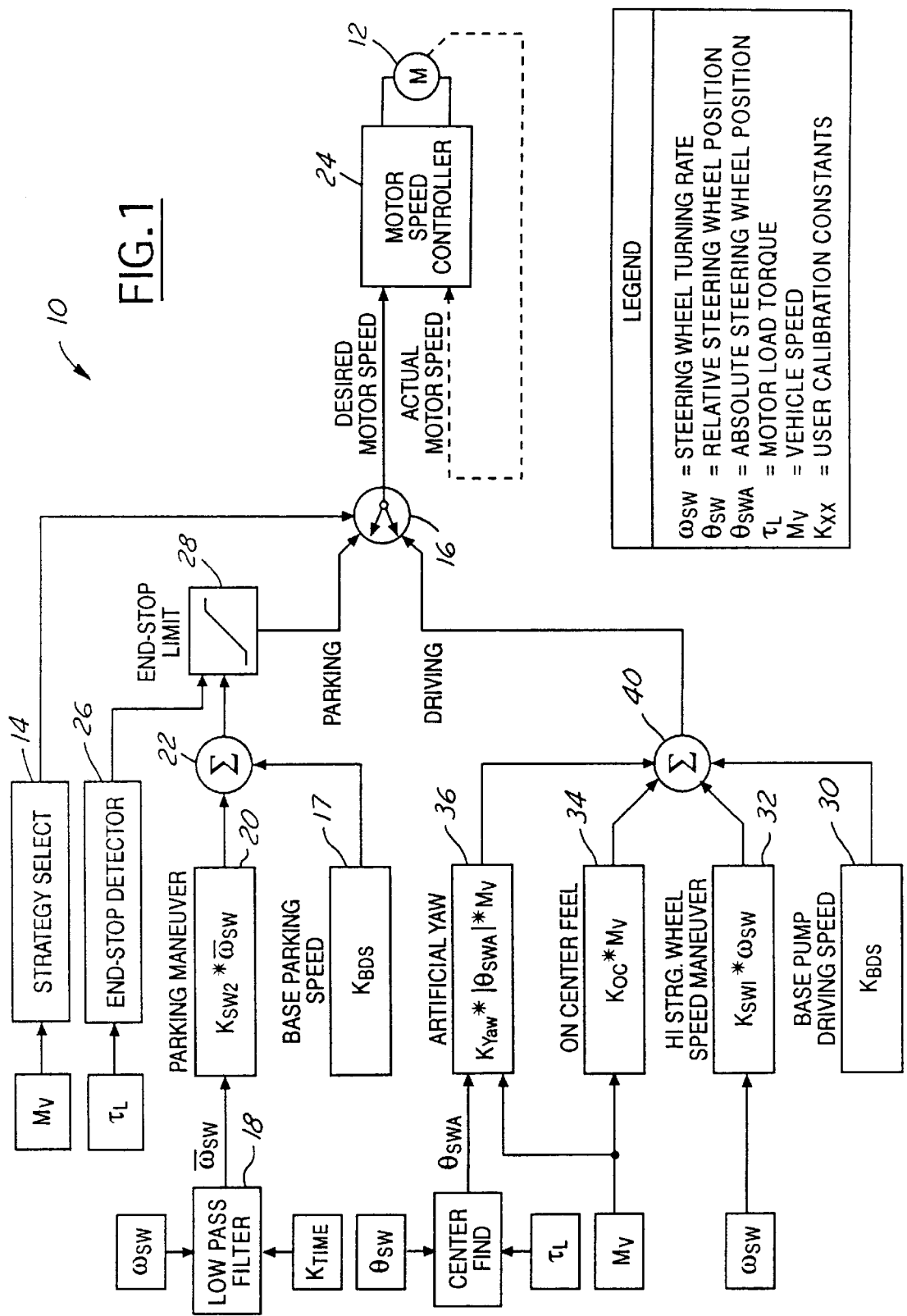

METHOD FOR CONTROLLING AN ELECTRO-HYDRAULIC POWER ASSIST STEERING SYSTEM

TECHNICAL FIELD

The present invention relates to a method for controlling an electro-hydraulic power assist steering system by controlling electric motor speed based upon vehicle speed, vehicle steering angle, and vehicle steering wheel turning rate.

BACKGROUND OF THE INVENTION

In conventional power assist steering systems, hydraulic fluid used for assisting steering action is directly driven by the engine, which typically results in a 2% to 4% efficiency loss because a substantial amount of energy from the engine is used to pump hydraulic fluid in the power assist steering system when no steering assist is needed. Typically, the percentage of time in which a vehicle driver is actually turning the steering wheel in a manner which requires power assist is very small. However, because a significant amount of force is required for steering assist in certain situations, generally a high base pumping rate is maintained to provide rapid ramp-up for steering assist when needed. This high base pumping rate results in the significant efficiency losses.

The use of electric motors in driving the power assist hydraulic fluid has resulted in an improvement in efficiency. However, it is further desirable to provide optimal power steering assist under a variety of vehicle operating conditions while maintaining a substantially low base pump speed for optimal efficiency. Preferably, the pump will run at a very slow speed when not needed, while having the capacity to quickly ramp-up to a desired speed when required. The system must be robust, which may be achieved by limiting the number of sensors used, and must also be economical and not prone to failure.

Known prior art systems provide electric motors which have only two speeds, high and low, which is undesirable for noise and efficiency reasons. One prior art system described in U.S. Pat. No. 5,508,919 to Suzuki et al. provides improved control systems, however, relies upon pressure control, rather than controlling motor speed for flow control, therefore it still requires metering valve adjustability. Such a system will provide only minor efficiency improvements. Because such a system would operate at a constant pump flow, all of the system tuning must be achieved through complicated modifications to the metering valve, which results in a compromise between the performances during the various steering modes.

It is therefore desirable to provide a power assist steering control system in which efficiency is significantly improved while providing optimal power steering assist under a variety of vehicle handling conditions.

DISCLOSURE OF THE INVENTION

The present invention provides a method of controlling an electro-hydraulic power assist steering system in which the speed of a variable-speed electric motor is controlled based upon monitored vehicle speed, vehicle steering wheel angle, and vehicle steering wheel turning rate. In this manner, system efficiency may be optimized by maintaining a substantially low base motor speed while providing needed power steering assist in a wide variety of vehicle operating conditions.

More specifically, the present invention provides a method of controlling an electro-hydraulic power assist steering system including a variable speed electric motor for pumping hydraulic fluid in the system. The method includes: a) monitoring vehicle speed; b) monitoring vehicle steering wheel angle; c) monitoring vehicle steering wheel turning rate; d) selecting a parking mode or a driving mode based upon the monitored vehicle speed; e) controlling the speed of the variable speed electric motor based upon the monitored vehicle steering wheel turning rate if the parking mode is selected; and f) controlling the speed of the variable speed electric motor based upon the monitored vehicle speed, vehicle steering wheel angle and vehicle steering wheel angle turning rate if the driving mode is selected.

Preferably, the parking mode is selected if the vehicle speed is less than approximately 4 mph, and the driving mode is selected if the vehicle speed is greater than 4 mph.

The step of controlling the speed of the variable speed electric motor based upon monitored vehicle steering wheel turning rate if the parking mode is selected includes the steps of establishing a base motor speed and increasing the base motor speed in proportion to the monitored steering wheel turning rate. This increase is calibrated for optimal performance.

Preferably, when the driving mode is selected, the electric motor speed is controlled by establishing a base motor speed. Motor speed is then continuously adjusted from this base speed based upon selected monitored conditions. The motor speed is increased in proportion to the monitored steering wheel turning rate to accommodate evasive vehicle maneuvers. The motor speed is decreased in proportion to the monitored vehicle speed for improved on-center steering feel at high speeds. The motor speed is adjusted in proportion to the product of the monitored vehicle speed and an absolute value of the monitored vehicle steering wheel angle for medium to high-speed, constant radius turns. Each of the monitored values is calibrated for optimal efficiency and performance.

Preferably, in the parking mode of operation, the system senses the first time the vehicle steering wheel is rotated to an end stop, and thereafter limits electric motor speed when the steering wheel reaches the end stop in order to prevent large force build up which may result in pump failure.

Accordingly, an object of the present invention is to provide an improved method of controlling an electro-hydraulic power assist steering system in which the speed of a variable speed electric motor is controlled based upon vehicle speed, vehicle steering wheel angle, and vehicle steering wheel turning rate in order to optimize efficiency and enhance power steering assist performance under a wide variety of vehicle operating conditions.

The above object and other objects, features and advantages of the present invention are readily apparent from the following detailed description of the best mode for carrying out the invention when taken in connection with the accompanying drawings.

BRIEF DESCRIPTION OF THE DRAWING

FIG. 1 shows a schematic block diagram of a control system in accordance with the present invention.

DETAILED DESCRIPTION OF THE PREFERRED EMBODIMENT

The control system 10 shown in FIG. 1 in accordance with the present invention is part of an electro-hydraulic power assist steering system which uses an electric motor 12 to drive a hydraulic pump, which in turn produces the system pressure used to move the steering rack. The pump flow is continuously varied, preferably every millisecond, by control of the speed of the electric motor. This control technique provides the minimum amount of flow required to maintain good steering feel without wasting energy. This method of control provides a substantial improvement in efficiency over other electro-hydraulic and conventional power steering systems, since both generally provide excessive pump flow during most steering conditions.

Using variable flow and an improved strategy permits the optimization of each steering mode, independent of the others, through appropriate control of the pump flow. Further, the steering system response can be widely reconfigured in software, offering many new alternatives for customized steering feel.

This algorithm uses vehicle speed ($M_V$), steering wheel relative position ($\theta_{SWA}$) and steering wheel turning rate ($\omega_{SW}$) as the control inputs. From this information, three driving conditions and one parking condition may be identified and accommodated. The three driving conditions are: on-center, evasive maneuver, and constant radius turning. Each of the driving conditions has an independent strategy, with unique set of calibration parameters for that particular condition. Each mode is then tuned for optimum performance with a minimum of interaction with the other steering modes. These calibration parameters allow for a wide range of system tuning which can provide different configurations for different vehicle lines, vehicle models, individual driver preference, and individual markets, all without any hardware changes; therefore, reducing the complexity of the hardware.

FIG. 1 shows the electro-hydraulic power assist steering control system block diagram of the present invention. The system 10 is broken into two modes, a parking control mode and a driving control mode, each with an independent strategy. The selection between the modes is based upon the vehicle speed $M_V$. The selection is illustrated at block 14. The selection process is used to control a switch 16. If the vehicle speed is less than approximately 4 mph, than the parking mode is selected, and the driving mode is selected if the vehicle speed $M_V$ is greater than approximately 4 mph.

In the parking control mode, the main input is the steering wheel turning rate signal $\omega_{SW}$. In this parking mode, a base parking speed is established, as indicated at block 17, and is increased in proportion to the monitored steering wheel turning rate $\omega_{SW}$. The monitored steering wheel turning rate $\omega_{SW}$ enters a low pass filter 18, and the adjustment is calculated at block 20, and the desired motor speed is increased at the summation block 22 by the product of $K_{SW2}*\overline{\omega}_{SW}$. The "K" values in this description are calibration constants. In this manner, a motor speed command is generated for the motor speed controller 24.

When the steering wheel is rotated to the end of travel, on the end stop, large pressures can be built up in an electro-hydraulic, as well as a conventional power steering system. With this improved strategy, the end stop is sensed, as represented at block 26, by the monitoring of the motor torque load $\tau_L$. This is achieved by looking for a certain torque load ($\tau_L$) signature which is indicative of the end stop being reached. When such signature is repeated, it is assumed that the steering wheel is being held at the end stop. During further attempts to hold the rack at the end stop, the system will limit power consumption to a small level by limiting the desired motor speed command, as represented by the limiter block 28. The parking control strategy functions (17,20,26) are calibrated using constants ($K_{BDS}$, $K_{TIME}$, $K_{SW2}$, $\tau_L$) for optimizing performance during operation.

When the switch 16 is in the driving control mode, each of the three components of the desired motor speed are designed to be independently functioning and independently tunable. A base motor speed is established, as represented by block 30. The base pump driving speed is set at a low level such that while the vehicle is driving straight ahead, only a small amount of flow is supplied by the base motor speed block 30. During conditions that demand fast steering system response, the maneuver compensation block 32 rapidly increases the motor speed command in proportion to the steering wheel turning rate $\omega_{SW}$ to allow the steering system to provide fast response.

As the vehicle speed $M_V$ increases, the flow is proportionately reduced to maintain a good, solid on-center steering feel, as represented by block 34.

During large, high speed turns, large forces would build up on the steering wheel, however, the artificial yaw block 36 prevents this situation by adjusting the motor speed proportionately to counteract these yaw forces. This adjustment may be a positive or negative adjustment, depending upon the particular vehicle design or, on a system having driver-variable parameters, it may be adjusted based on driver needs. Together, the various substrategies 30, 32, 34, 36 maintain a consistent steering feel throughout the entire range of driving situations by continuously adjusting the motor speed command at the summation block 40.

It is estimated that this system has the potential for fuel economy improvements of 1% to 3%.

While the best mode for carrying out the invention has been described in detail, those familiar with the art to which this invention relates will recognize various alternative designs and embodiments for practicing the invention within the scope of the appended claims.

What is claimed is:

1. A method of controlling an electro-hydraulic power assist steering system including a variable-speed electric motor for pumping hydraulic fluid in the system, the method comprising:

monitoring vehicle speed;

monitoring vehicle steering wheel angle;

monitoring vehicle steering wheel turning rate;

determining a mode of operation of the vehicle based on the monitored vehicle speed such that below a predetermined level of speed the vehicle is determined to be in a park mode and at or above this level the vehicle is determined to be in a drive mode;

controlling the speed of the variable speed electric motor to vary hydraulic fluid flow in the power assist steering system based upon said monitored vehicle steering wheel turning rate if said parking mode is determined; and controlling the speed of the variable speed electric motor to vary hydraulic fluid flow in the power assist steering system based upon said monitored vehicle speed, vehicle steering wheel angle and vehicle steering wheel turning rate if said driving mode is determined.

2. The method of claim 1, wherein said step of determining a mode of operation of the vehicle comprises determining the parking mode if said monitored vehicle speed is less than approximately 4 mph and determining the driving mode if said monitored vehicle speed is greater than approximately 4 mph.

3. The method of claim 1, wherein said step of controlling the speed of the variable speed electric motor based upon said monitored vehicle steering wheel turning rate if said parking mode is determined comprises establishing a base motor speed and increasing the motor speed in proportion to said monitored steering wheel turning rate.

4. The method of claim 3, wherein said step of increasing the motor speed further comprises calibrating said monitored steering wheel turning rate.

5. The method of claim 1, wherein said step of controlling the speed of the variable speed electric motor based upon said monitored vehicle speed, vehicle steering wheel angle and vehicle steering wheel turning rate comprises:

establishing a base motor speed;

increasing said established motor speed in proportion to said monitored steering wheel turning rate to accommodate evasive vehicle maneuvers;

decreasing the motor speed in proportion to said monitored vehicle speed for improved on-center steering feel at high speeds; and adjusting the motor speed in proportion to the product of said monitored vehicle speed and an absolute value of said monitored vehicle steering wheel angle.

6. The method of claim 5, wherein each of said increasing, decreasing and adjusting steps further comprises calibrating the respective monitored rate, speed or angle.

7. The method of claim 1, further comprising:

sensing the vehicle steering wheel reaching an end stop; and thereafter limiting electric motor speed when the steering wheel reaches the end stop.

8. A method of controlling an electro-hydraulic power assist steering system including a variable-speed electric motor for pumping hydraulic fluid in the system, the method comprising:

monitoring vehicle speed;

monitoring vehicle steering wheel angle;

monitoring vehicle steering wheel turning rate;

determining a mode of operation of the vehicle based on the monitored vehicle speed such that below a predetermined level of speed the vehicle is determined to be in a park mode and at or above this level the vehicle is determined to be in a drive mode;

controlling the speed of the variable speed electric motor based upon said monitored vehicle steering wheel turning rate if said parking mode is determined;

controlling the speed of the variable speed electric motor based upon said monitored vehicle speed, vehicle steering wheel angle and vehicle steering wheel angle turning rate if said driving mode is determined; and wherein said step of determining a mode of operation of the vehicle comprises determining the parking mode if said monitored vehicle speed is less than approximately 4 mph and determining the driving mode if said monitored vehicle speed is greater than approximately 4 mph.

* * * * *